US010189513B2

(12) United States Patent
Heil

(10) Patent No.: US 10,189,513 B2
(45) Date of Patent: Jan. 29, 2019

(54) SENSOR BASED CLOSED LOOP CONTROL OF ACTIVE AERODYNAMIC ELEMENTS

(71) Applicant: GM GLOBAL TECHNOLOGY OPERATIONS LLC, Detroit, MI (US)

(72) Inventor: Edward T. Heil, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 15/265,169

(22) Filed: Sep. 14, 2016

(65) Prior Publication Data

US 2017/0088194 A1   Mar. 30, 2017

Related U.S. Application Data

(60) Provisional application No. 62/232,797, filed on Sep. 25, 2015, provisional application No. 62/232,788, filed on Sep. 25, 2015.

(51) Int. Cl.

| | |
|---|---|
| *G01L 5/00* | (2006.01) |
| *G05D 3/20* | (2006.01) |
| *B62D 35/00* | (2006.01) |
| *B62D 35/02* | (2006.01) |
| *G01L 13/00* | (2006.01) |

(52) U.S. Cl.
CPC ........... *B62D 35/00* (2013.01); *B62D 35/007* (2013.01); *B62D 35/02* (2013.01); *G01L 5/00* (2013.01); *G01L 13/00* (2013.01); *G05D 3/20* (2013.01)

(58) Field of Classification Search
CPC .. B62D 35/001; B62D 35/005; B62D 35/007; B62D 35/008; G01L 5/00; G05D 3/12; G05D 3/20

USPC .......................................................... 701/49
See application file for complete search history.

(56) References Cited

U.S. PATENT DOCUMENTS

| 7,367,530 B2 * | 5/2008 | Harrigan ................. B64C 9/146 244/184 |
| 7,517,004 B2 * | 4/2009 | Honeycutt ........... B62D 35/007 296/180.1 |
| 9,561,844 B2 * | 2/2017 | Yogev ....................... B64C 9/12 |

(Continued)

FOREIGN PATENT DOCUMENTS

| CN | 104859730 A | 8/2015 |
| DE | 102007028143 A1 | 12/2008 |

*Primary Examiner* — Krishnan Ramesh
(74) *Attorney, Agent, or Firm* — Quinn IP Law

(57) ABSTRACT

A method of controlling an active aerodynamic element for a vehicle includes determining a target position for the active aerodynamic element from a target aerodynamic force, which may be a given value that is provided based on dynamic conditions of the vehicle. The method actuates the active aerodynamic element to the target position and senses an aerodynamic response characteristic of the active aerodynamic element while actuated to the target position. An estimated applied aerodynamic force is determined from the aerodynamic response characteristic, and is compared to the target aerodynamic force. A force error is determined from the comparison of the estimated applied aerodynamic force and the target aerodynamic force, and a modified position for the active aerodynamic element is determined from the force error and the target aerodynamic force. The active aerodynamic element is actuated to the modified position.

12 Claims, 5 Drawing Sheets

(56) References Cited

U.S. PATENT DOCUMENTS

| | | | |
|---|---|---|---|
| 2006/0284022 A1* | 12/2006 | Harrigan | B64C 9/146 244/203 |
| 2008/0116717 A1* | 5/2008 | Honeycutt | B62D 35/007 296/180.5 |
| 2012/0126572 A1* | 5/2012 | Hjelm | B62D 35/001 296/180.1 |
| 2013/0020432 A1* | 1/2013 | Yogev | B64C 9/12 244/51 |
| 2015/0054302 A1 | 2/2015 | Yamaguchi et al. | |
| 2015/0149046 A1* | 5/2015 | Jeong | G01G 19/12 701/49 |
| 2015/0321707 A1* | 11/2015 | Menicovich | B62D 35/00 296/180.1 |
| 2018/0111648 A1* | 4/2018 | Amar | B62D 35/001 |

* cited by examiner

SENSOR BASED CLOSED LOOP CONTROL OF ACTIVE AERODYNAMIC ELEMENTS

CROSS-REFERENCE TO RELATED APPLICATIONS

This application claims the benefit of U.S. Provisional Application No. 62/232,797, filed Sep. 25, 2015, and of U.S. Provisional Application No. 62/232,788, filed Sep. 25, 2015, both of which are hereby incorporated by reference in its entirety.

TECHNICAL FIELD

This disclosure generally relates to control of aerodynamic features of vehicles.

BACKGROUND

Vehicles—particularly performance automobiles but also industrial, heavy duty, or passenger vehicles—may include multiple active aerodynamic elements. Vehicle design related to aerodynamics includes factors affecting vehicle drag, wind noise, vehicle noise emissions, and lift forces that affect traction, cornering and other elements of vehicle stability. Aerodynamic design elements may include passive elements and actively controlled elements.

SUMMARY

A method of controlling an active aerodynamic element for a vehicle is provided. The method includes determining a target position for the active aerodynamic element from a target aerodynamic force. The target aerodynamic force may be a given value that is provided based on dynamic conditions of the vehicle. The active aerodynamic element is actuated to the target position.

The method actuates the active aerodynamic element to the target position and senses an aerodynamic response characteristic of the active aerodynamic element, while it is actuated to the target position. An estimated applied aerodynamic force is determined from the aerodynamic response characteristic, and that estimated applied aerodynamic force is compared to the target aerodynamic force.

A force error is then determined from the comparison of the estimated applied aerodynamic force and the target aerodynamic force. A modified position for the active aerodynamic element is determined from the force error and the target aerodynamic force. The active aerodynamic element is actuated to the modified position.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
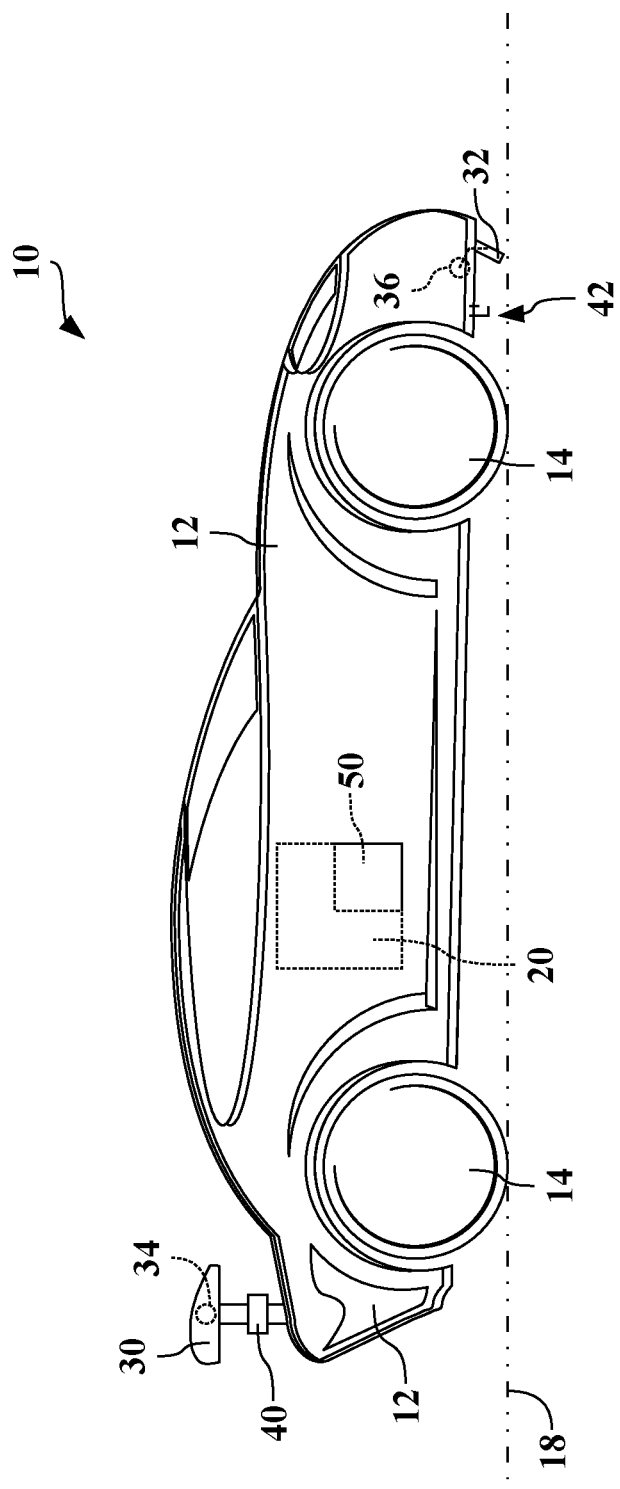
FIG. 1 is a schematic, side view of a generic vehicle having at least two active aerodynamic elements.

Referring to the drawings, like reference numbers correspond to like or similar components whenever possible throughout the figures. FIG. 1 broadly illustrates or diagrams a vehicle 10, which may be a hybrid, electric, or conventional vehicle. The vehicle 10 is illustrated as a coupe or sporty vehicle but is intended to generically represent many different types of automobiles or other vehicles.

The vehicle 10 is illustrated in FIG. 1 with a body 12 and a plurality of wheels 14 drivingly connecting the body 12 to a road surface or ground plane 16. As used herein, the body 12 generally refers to the structure of vehicle, including the chassis, if separate from the body panels.

The wheels 14 may be driven by a number of traction sources or primary movers, including, without limitation: internal combustion engines, electric machines, and combinations thereof. Furthermore, the wheels 14 are subject to a number of autonomous or semi-autonomous yaw controlling systems, including, without limitation: electronic stability control, antilock braking systems, or active differentials.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

FIG. 1 schematically illustrates a controller or control system 20 that is in communication with numerous systems and components throughout the vehicle 10 via wired or wireless communication protocols. The control system 20 is representative of the entire control and computational architecture of the vehicle 20. The control system 20 includes a sufficient amount of memory and processing power to receive signal inputs from, and output commands, data, or instructions to, all systems over which the control system 20 is in command or monitoring.

The control system 20 is an electronic device that is configured, i.e., constructed and programmed, to regulate systems and components of the vehicle 10. The control system 20 may be configured as a central processing unit (CPU) that is also configured to regulate operation of the engine or other primary movers. Alternatively, the control system 20 may be a dedicated controller for only the systems discussed herein. The control system 20 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the control system 20 may include, for example, optical or magnetic disks and other persistent memory. Volatile media may include, for example, dynamic random access memory (DRAM), which may constitute a main memory. Such instructions may be transmitted by one or more transmission mechanisms, including coaxial cables, copper wire and fiber optics, including the wires that comprise a system bus coupled to a processor of a computer. Memory of the control system 20 may also include a floppy disk, a flexible disk, hard disk, magnetic tape, any other magnetic medium, a CD-ROM, DVD, any other optical medium, etc. The control system 20 can be configured or equipped with other required computational hardware, such as a high-speed clock; requisite Analog-to-Digital (A/D) and Digital-to-Analog (D/A) circuitry; input output circuitry and devices (I/O); as well as appropriate signal conditioning and buffer circuitry. Any algorithms required by the control system 20, or accessible thereto, may be stored in the memory and automatically executed to provide the required functionality.

The vehicle 10 preferably includes a plurality of sensors (not all of which are shown) for monitoring operation related to vehicle ride and handling. A plurality of wheel speed sensors may be arranged on the body 12 for detecting rotating speeds of each road wheel 14. Each wheel speed sensors may also be configured to communicate the detected rotating speed of the respective road wheel 14 to the control system 20, while the control system 20 may be configured to correlate the data received from the respective wheel speed sensors to road speed of the vehicle 10.

The vehicle 10 may also include one or more yaw sensors configured to detect a yaw moment or rate on the body 12 relative to the ground plane 16 and communicate the detected yaw rate to the control system 20. Additionally, the vehicle 10 may include a steering sensor operatively connected to a steering wheel (not shown) and configured to detect an angle of the steering wheel during operation of the vehicle 10. An intended direction of the vehicle 10 may be identified by the steering wheel angle detected by the steering sensor and communicated to the control system 20.

The vehicle may additionally include an ambient sensor on the upper portion of the body 12 configured to detect an overbody air speed, which may be a velocity of ambient airflow relative to the vehicle 10. The ambient air speed sensor may be additionally configured to communicate the detected velocity of the ambient airflow to the control system 20. The ambient air speed sensor may be, for example, a pitot-static tube configured to detect a pressure of the ambient airflow at a specific location relative to the body 12, such as the top of the passenger compartment or the front end of the body 12. The control system 20 may be configured to correlate the measured pressure to airflow velocity.

Some of the aforementioned sensors may be in the form of rotational position sensors, linear position sensors, ultrasonic sensors, laser sensors and inertial-based acceleration sensors. Heading angle calculation may be determined from a pitot tube or other vehicle dynamics information providing inertial estimates. Air density calculation may be derived from manifold absolute pressure and outside air temperatures.

The vehicle 10 includes one or more systems for actively controlling vehicle ride and handling. This may include one or more routines for controlling positions of one or more active aerodynamic elements and may also include an active suspension system that is configured to adjust suspension damping and/or front and rear ride heights in response to a control signal that is based upon operating conditions.

The vehicle 10 may further include an active braking system that may include anti-lock braking and other features. The vehicle 10 may include an active steering system configured to control vehicle steering rates in response to operating conditions.

Figure 4:
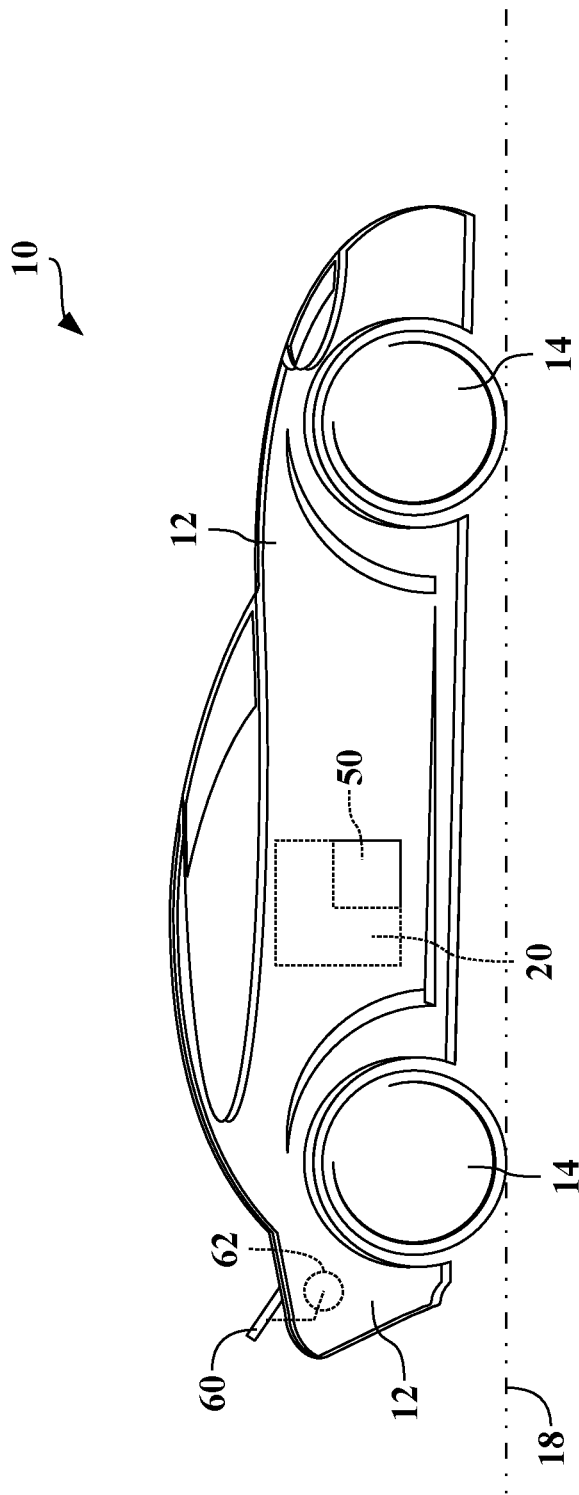
FIG. 4 is a schematic, side view of the vehicle shown in FIG. 1, configured with another alternative active aerodynamic element—a spoiler—mounted at the rear of the vehicle.

The vehicle 10 includes one or more active aerodynamic elements, two of which are illustrated in FIG. 1 (and a third, illustrative, active aerodynamic element is shown in FIG. 4). The active aerodynamic elements may each be moved or articulated to a plurality of positions relative to the body 12.

The active aerodynamic elements in the figures are schematic and illustrative only, and may be representative of several types of aerodynamic elements. Additionally, the active aerodynamic elements shown may be illustrative of multiple elements that operate in concert, such as an array of small deflectors, spoilers, or wings.

In the configuration illustrated in FIG. 1, one of the active aerodynamic elements, positioned at the rear of the body 12, is a wing 30, and another of the active aerodynamic elements, positioned at the front and on the underside of the body 12, is an underbody deflector or deflector 32. The example active aerodynamic elements are variably positionable to selectively provide aerodynamic downforce on the vehicle 10.

Aerodynamic downforce is aerodynamic lift along the negative Z axis (i.e., toward the ground plane 16) that is applied to the vehicle body 12. The downforce then applies an increased normal force to the wheels 14, which may increase the frictional forces (grip) between the wheels 14 and the road surface. However, note that other active aerodynamic elements may be used to create other aerodynamic effects, such as drag reduction or lateral stability, and that the active aerodynamic elements described herein may also contribute other aerodynamic effects.

One or more actuators articulate the active aerodynamic elements. In some configurations, specific or dedicated actuators will control individual active aerodynamic elements. In other configurations, one actuator may control multiple active aerodynamic elements. As schematically illustrated in FIG. 1, a wing actuator 34 is configured to position the wing 30 at a plurality of positions and a deflector actuator 36 is configured to position the deflector 32 to any of a plurality of positions.

Figure 3:
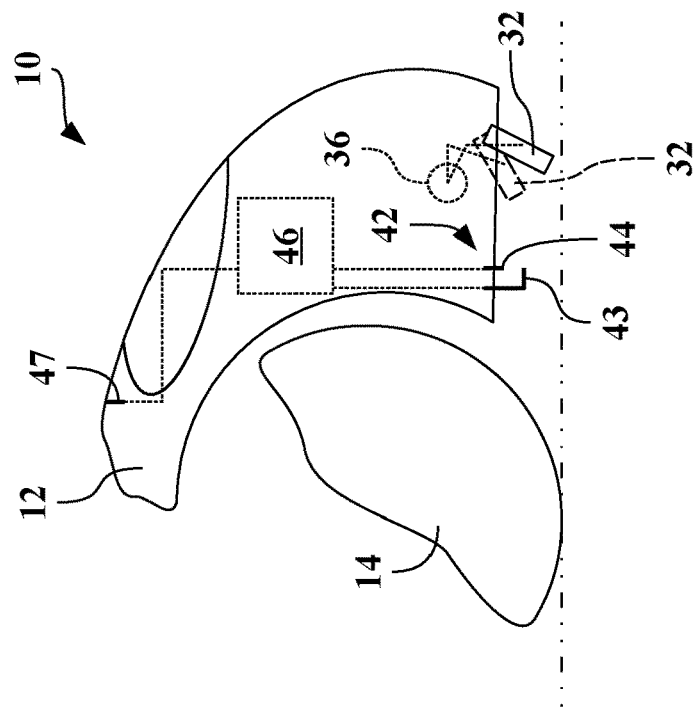
FIG. 3 is a schematic, detail view of another active aerodynamic element—a deflector—mounted to the forward underbody of the vehicle shown in FIG. 1 and having a pressure sensor array mounted nearby.
Figure 2:
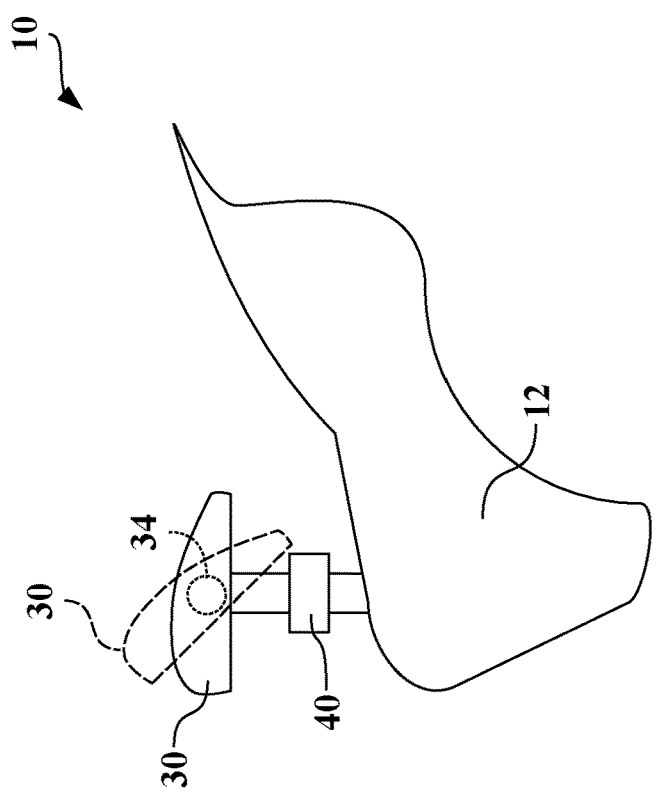
FIG. 2 is a schematic, detail view of an active aerodynamic element—a wing that is mounted via structures including a force sensor—at the rear of the vehicle shown in FIG. 1.

Referring also to FIGS. 2 and 3, and with continued reference to FIG. 1, there are shown detail views of the active aerodynamic elements of the vehicle 10. FIG. 2 illustrates the wing 30 on a portion of the rear of the body 12 and FIG. 3 illustrates the deflector 32 on an underside portion of the body 12.

As shown in FIG. 2, a force sensor 40 is operatively disposed between the wing 30 and the body 12. In the configuration shown, the wing 30 is mounted on one or more stanchions or arms. The force sensor 40 reads an applied force between the wing 30 and the body 12, such that the force sensor 40 provides a direct or indirect measure of the downforce delivered to the vehicle 10 by the wing 30. In many configurations, there will be multiple arms holding the wing 30, such that each arm may include the force sensor 40. The force sensor 40 is used to determine an aerodynamic response characteristic based on position of the active aerodynamic element.

The wing actuator 34 controls or sets the wing 30 to different positions, one of which is illustrated in solid lines and another of which is illustrated in dashed lines. Different positions or angles of the wing 30 produce different amounts of downforce. Furthermore, the speed of the vehicle 10 and ambient air conditions, in addition to other factors, affect the amount of downforce produced by the wing 30 in any position.

As shown in FIG. 3, one or more pressure sensors or a pressure-sensing array 42 is located near the deflector 32. The pressure-sensing array 42 illustrated includes two tubes, a pitot tube 43 and a static tube 44, that are each operatively connected to one or more pressure sensors 46 or sensing devices, such as a piezoelectric chip or a plurality thereof. Note, however, that one or more combined pitot-static tubes may also be used. The vehicle 10 may also include additional pressuring sensing structures, such as an upper static tube 47 or a pitot-static tube similarly located.

The tubes of the pressure-sensing array 42 determine the velocity of air flowing at, or nearby, the deflector 32. One tube, the pitot tube 43, is oriented parallel to the airflow, and senses a stagnation pressure; and one tube, the static tube 44, is oriented perpendicular to the airflow, and senses a static pressure. Some configurations may use a combination, pitot-static tube that senses both the stagnation and static pressures with one structure disposed within the airflow. The pressure-sensing array 42 is used to determine an aerodynamic response characteristic based on position of the active aerodynamic element.

Additionally, the pressure sensors 46 may include differential pressure sensors that determine only the pressure differential between the stagnation pressure and the static pressure. The difference between the stagnation pressure and the static pressure is a dynamic pressure, which may be used to determine the velocity of the airflow. Alternatively, the pitot tube 43 and the static tube 44 may be located in front of the deflector 32, such that the pressure-sensing array 42 is affected by increased air speed before passing underneath the deflector 32.

The approximate airflow velocity (air speed) at the pressure-sensing array 42 may be determined from one or more equations or calculations, including, for example: velocity= [2*(p_stagnation−p_static)/density]" ". Where the density is a characteristic of the ambient or atmospheric conditions, including temperature, pressure, and humidity; and the stagnation pressure (p_stagnation), static pressure (p_static), or dynamic pressure (p_stagnation−p_static) are derived from the pressure-sensing array 42.

The deflector actuator 36 controls or sets the deflector 32 to different positions, one of which is illustrated in solid lines and another of which is illustrated in dashed lines. Note that the deflector 32 may alternatively retract and deploy vertically from within the body 12, as opposed to rotating (as illustrated in FIG. 3).

Different positions or angles of the deflector 32 produce different amounts of downforce. The deflector 32 increases the airflow velocity by limiting the space through which air can flow at the front underside of the vehicle 10. If the deflector 32 causes the airflow velocity underneath the front of vehicle 10 (i.e., an underbody air speed) to be greater than the airflow velocity above the front of the vehicle 10 (i.e., an overbody air speed), the deflector 32 will introduce aerodynamic downforce.

The vehicle 10 shown includes an aero controller 50 in communication with at least the force sensor 40 and the wing actuator 34, and the pressure-sensing array 42 and the deflector actuator 36. The aero controller 50 is configured to instruct the wing actuator 34 and the deflector actuator 36 to adjust the position of the wing 30 and the deflector 32, respectively. The aero controller 50 may be a module or portion of the control system 20, or may be a separate control structure that is in communication with the control system 20.

Referring also to FIG. 4, and with continued reference to FIGS. 1-3, the vehicle 10 is illustrated with a different active aerodynamic element configuration. FIG. 4 shows the vehicle 10 with a spoiler 60 operatively attached to the rear of the body 12, instead of the rear wing 30 shown in FIG. 1.

In general, spoilers are active aerodynamic elements having airflow moving over only one side, and wings are active aerodynamic elements having airflow moving over both sides. The techniques and control methods discussed in relation to FIG. 1 may also be applied to the configuration shown in FIG. 4.

Position of the spoiler 60 is controlled via a spoiler actuator 62. As the spoiler 60 is deployed—i.e., moved away from the body 12—it alters airflow and creates downforce, depending on the dynamics of the vehicle 10, and other conditions. Therefore, the aero controller 50 may deploy the spoiler 60 to create targeted levels of downforce.

Figure 5:
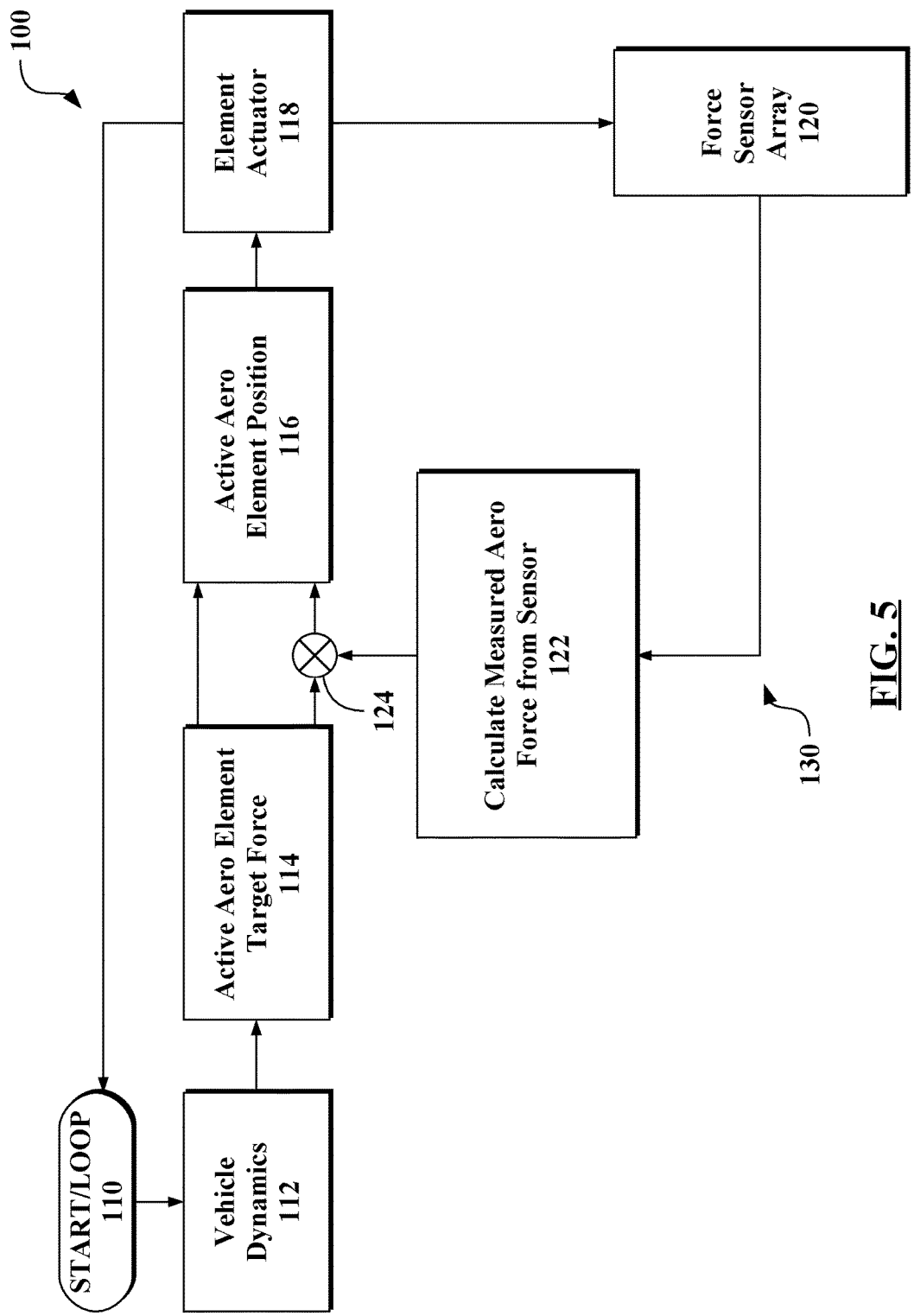
FIG. 5 is a schematic, block diagram or flow chart of a process for controlling active aerodynamics in vehicles, such as those illustrated in FIGS. 1 and 4, with force-based closed loop feedback.

Referring now to FIG. 5, and with continued reference to FIGS. 1-4, there is shown a method or control scheme 100, which is illustrated by a partial block diagram or flow diagram, for controlling active aerodynamic elements of vehicle, such as the vehicle 10 in any of the configurations shown in FIGS. 1-4. The control scheme 100 shown in FIG. 5 utilizes force-based feedback to improve the accuracy of force delivered by the controlled active aerodynamic element.

The control scheme 100 may be described herein with reference to components of the vehicle 10. However, the control scheme 100 may also be utilized, in whole or part, on vehicles having different architectures, configurations, or capabilities, and on active aerodynamic elements having different aerodynamic effects. FIG. 5 illustrates some of the inputs, considerations, and steps for determining the position of active aerodynamic elements, but is neither a complete control diagram nor algorithm.

Block 110: Start/Loop.

The control scheme 100 may be running or looping constantly, such as whenever the vehicle 10 is operational. Alternatively, the control scheme 100 may be called upon in specific situations or under specific conditions. The control system 20, the aero controller 50, another controller of the vehicle 10, or combinations thereof, may execute the control scheme 100.

Block 112: Vehicle Dynamics Processor.

The control scheme 100 includes monitoring dynamic driving conditions of the vehicle 10. The vehicle dynamics processor is a collection of software components that generate processed and estimated signals that represent the current state of the vehicle 10 through measurements and driver request, and may be incorporated into other controller architecture, such as the controller 20, or may be part of a dedicated control system. In addition to controlling yaw influencing systems, the vehicle dynamics processor will determine the levels of aerodynamic force needed or requested from the active aerodynamic elements. For example, the control system 20 may determine that a total amount of downforce would benefit vehicle dynamics.

Block 114: Active Aerodynamic Element Force Determination.

From the total downforce needs, the force needed from the individual active aerodynamic elements may be determined. For example, the aero controller 50 may determine the target amount of downforce to be generated by the wing 30, the deflector 32, or both, to satisfy the driving dynamics needs of the vehicle 10. The target aerodynamic force may be provided to the aero controller 50, such as from another portion of the control system 20, based on dynamic conditions of the vehicle 10.

The total target aerodynamic downforce for the vehicle 10, and the target downforce for individual active aerodynamic elements, may be determined by the control system 20 based on many parameters of vehicle dynamics. Such parameters include, without limitation: front and rear vehicle ride height, pitch, roll, heading angle, air velocity, and vehicle velocity. Furthermore, operator demands (including those from autonomous or semi-autonomous systems, like adaptive cruise control) may be factored into such determinations. The vehicle dynamics processor may also incorporate lateral and longitudinal acceleration, wheel speed and wheel slip, and yaw rate to determine the levels of aerodynamic downforce requested of the active aerodynamic elements.

Block 116: Active Aerodynamic Element Position Determination.

The control scheme 100 determines a target position for the active aerodynamic element from the target aerodynamic force. This position is calculated based on testing and characterization of the active aerodynamic elements under varying conditions, such as in wind tunnels or with computational fluid dynamics software, and may be determined in real time by the vehicle 10, or through communication networks, from lookup tables or polynomial equations.

For example, in order to produce the target aerodynamic downforce at the rear of the body 12, the wing 30 may be placed at a specific angle. The aero controller 50 or the control system 20 may determine the target position for the wing 30.

Block 118: Element Actuator Controls to Target Position.

The control scheme 100 includes controlling the actuator to physically place the active aerodynamic element into the target position. For example, the aero controller 50 may control the wing actuator 34 to place the wing 30 into the target position, which may be an attack angle. This may occur by moving the wing 30 from the position shown in solid lines to the position shown in dashed lines.

Once the wing actuator 34 has placed the wing 30 into the target position, the expected downforce is relayed back to the vehicle dynamics processor, such that the estimated downforce applied by the wing 30 may be incorporated into driving dynamics calculations for the vehicle 10. Preferably, the actual downforce produced by the wing 30 is equal to the target aerodynamic force determined in block 114.

Block 120: Force Sensor Array.

As the active aerodynamic element is set to the target position, the control scheme 100 also includes sensing an applied force between the active aerodynamic element and the vehicle 10. For example, in the configuration shown, the force sensor 40 senses the force applied between the wing 30 and the body 12. The force sensor array is determining an aerodynamic response characteristic based on position of the active aerodynamic element.

Block 122: Calculate Measured Aerodynamic Force.

From the applied force sensed by the force sensor 40, the control scheme 100 determines or calculates an actual or measured aerodynamic force at the active aerodynamic element. The force applied to the force sensor 40 is indicative of the actual downforce being produced by the wing 30. The exact relationship between the force applied at the force sensor 40 and the actual downforce of the wing 30 may be determined through testing or calibration.

In the configuration shown, with substantially vertical support arms for the wing 30, there may be a direct relationship between the applied force at the force sensor 40 and the measured downforce introduced by the wing 30 to the body 12. However, in other configurations, such as those having the force sensor 40 within only a portion of the support structure or within an angled arm support, there may be a non-linear or indirect relationship between the applied force at the force sensor 40 and the actual downforce at the wing 30.

Comparison 124: Target vs. Measured Aerodynamic Force.

The control scheme 100 compares the measured aerodynamic force to the target aerodynamic force and determines a force error or force differential therefrom. The comparison of the measured aerodynamic force and the target aerodynamic force represents whether the target position of the wing 30 is producing the expected downforce. Therefore, the control scheme 100 has a closed loop 130 that verifies the downforce at the active aerodynamic element.

The control scheme 100 determines a modified position for the active aerodynamic element from the force error and from the target aerodynamic force. If the measured force from the force sensor 40 is substantially equal to the target aerodynamic force, the comparison 124 will result in substantially zero force error, and the modified position effected by block 116 will be substantially the same as the target position for the wing 30.

However, if the measured force from the force sensor 40 is different from the target aerodynamic force, the control scheme 100 will control the wing actuator 34 to place the wing 30 into the modified position. The block 116 outputs the modified position to the element actuator at block 118, such that the position of the active aerodynamic element is physically adjusted. Note that the closed loop modification may be occurring on an iterative loop, such that the force error is only used to modify the same target aerodynamic force. The close-loop modification may be dormant until it is able to determine whether the currently requested target aerodynamic force is being satisfied, as opposed to a previously requested target.

Figure 6:
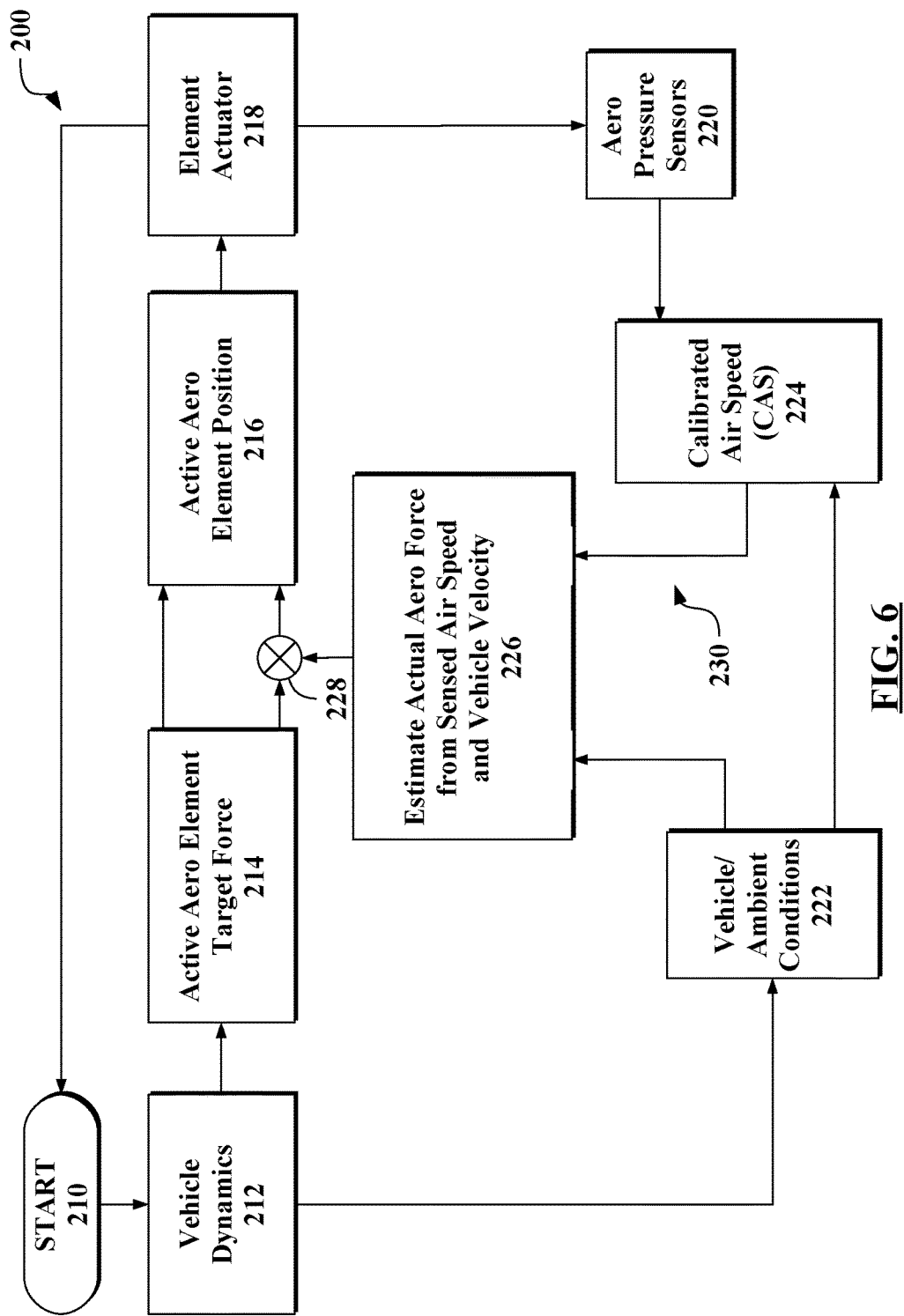
FIG. 6 is a schematic, block diagram or flow chart of a process for controlling active aerodynamics in vehicles, such as those illustrated in FIGS. 1 and 4, with pressure-based closed loop feedback.

Referring now to FIG. 6, and with continued reference to FIGS. 1-5, there is shown a method or control scheme 200, which is illustrated by a partial block diagram or flow diagram, for controlling active aerodynamic elements of vehicles, such as the vehicle 10 described relative to FIGS. 1-4, and other vehicles. The control scheme 200 shown in FIG. 6 utilizes pressure-based feedback, as contrasted with the force-based feedback of the control scheme 100 shown in FIG. 5, to improve the accuracy of force delivered by the controlled active aerodynamic element.

The control scheme 200 may be described herein with reference to components of the vehicle 10 and, in particular, the deflector 32. However, the control scheme 200 may also be utilized, in whole or part, on vehicles having different architectures, configurations, or capabilities, and on active aerodynamic elements have other aerodynamic effects. FIG. 6 illustrates some of the inputs, considerations, and steps for determining the position of active aerodynamic elements, but is neither a complete control diagram nor algorithm.

Block 210: Start/Loop.

The control scheme 200 may be running or looping constantly, such as whenever the vehicle 10 is operational. Alternatively, the control scheme 200 may be called upon in specific situations or under specific conditions. The control system 20, the aero controller 50, another controller of the vehicle 10, or combinations thereof, may execute the control scheme 200.

Block 212: Vehicle Dynamics Processor.

The control scheme 200 includes monitoring dynamic driving conditions of the vehicle 10. The vehicle dynamics processor is a collection of software components that generate processed and estimated signals that represent the current state of the vehicle 10 through measurements and driver request, and may be incorporated into other controller architecture, such as the controller 20, or may be part of a dedicated control system. In addition to controlling yaw influencing systems, the vehicle dynamics processor will determine the levels of aerodynamic force needed or requested from the active aerodynamic elements. For example, the control system 20 may determine that a total amount downforce on the vehicle 10 would benefit vehicle dynamics.

Block 214: Active Aerodynamic Element Force Determination.

From the total downforce needs, the force needed from the individual active aerodynamic elements may be determined. For example, the aero controller 50 may determine the target amount of downforce to be generated by the deflector 32, the wing 30, or both, to satisfy the driving dynamics needs of the vehicle 10. Alternatively, the target aerodynamic force may be provided to the aero controller 50, such as from another portion of the control system 20, based on dynamic conditions of the vehicle 10.

Block 216: Active Aerodynamic Element Position Determination.

The control scheme 200 determines a target position for the active aerodynamic element from the target aerodynamic force. This position is calculated based on testing and characterization of the active aerodynamic elements under varying conditions, such as in wind tunnels or with computational fluid dynamics software, and may be determined in real time by the vehicle 10, or through communication networks, from lookup tables or polynomial equations.

For example, in order to produce the target aerodynamic downforce at the front of the body 12, the deflector 32 may be placed at a specific angle. The aero controller 50 or the control system 20 may determine the target position for the deflector 32.

Block 218: Element Actuator Controls to Target Position.

The control scheme 200 includes controlling the actuator to place the active aerodynamic element into the target position. For example, the aero controller 50 may control the deflector actuator 36 to place the deflector 32 into the target position, which may be an angle of rotation imparted to either the deflector 32 or the deflector actuator 36. Once the deflector actuator 36 has moved or placed the deflector 32 into the target position, the expected downforce is relayed back to the vehicle dynamics processor, such that the estimated downforce applied by the deflector 32 may be incorporated into driving dynamics calculations for the vehicle 10.

The deflector 32 generates downforce on the vehicle 10 by increasing the speed of airflow underneath the front of the body 12. If the air speed caused by the deflector 32 is greater than the air speed above (i.e., the overbody air speed) the front of the body 12, the velocity differential results in downforce on the front of the body 12. Preferably, the downforce generated by the deflector 32 at the target position is equal to the target aerodynamic force determined in block 214.

Block 220: Pressure-sensing array.

As the active aerodynamic element is set to the target position, the control scheme 200 also includes sensing pressure of the airflow created by the active aerodynamic element. In particular, in the configuration shown, the pressure-sensing array 42 senses the pressure of airflow just behind the deflector 32, which may be used to determine the airflow velocity created by actuation of the deflector 32 to the target position.

Additional pressure sensors and pressuring-sensing structures may be contributing to the control scheme 200. For example, the upper static tube 47 may be determining the static pressure on the upper side of the body 12. The control scheme 200 is using the press-sensing array to determine an aerodynamic response characteristic based on position of the active aerodynamic element.

Block 222: Input Vehicle Conditions, Ambient Conditions, or Constants.

The control scheme 200 may utilize, for example, ambient air conditions, constants, or variables determined from the ambient conditions around the vehicle 10 as inputs for calculating the air speed created by the active aerodynamic element. In particular, the temperature, pressure, and humidity may affect the air speed created at the deflector 32.

Furthermore, the vehicle velocity may be used as an input to the control scheme 200. All of the inputs may be supplied by the control system 20, the aero controller 50, or other control systems, and may be determined based on various sensors, algorithms, or look-up tables.

Block 224: Calculate Calibrated Air Speed from Sensed Pressure.

The control scheme 200 determines, calculates, or estimates the air speed created by the active aerodynamic element. For example, from the dynamic pressure determined by the pressure-sensing array 42, which is the difference between the static pressure at the static tube 44 and the stagnation pressure at the pitot tube 43, and the ambient air conditions, the air speed may be determined as: velocity= $[2*(\text{p\_dynamic})/\text{density}]^{1/2}$. Where the density of the airflow is a variable determined from the ambient conditions.

Alternatively, the control scheme my use only constants to calculate a calibrated air speed (CAS) from the dynamic pressure, such that the air speed may be determined as: velocity=$a_0*\{5*[(\text{p\_dynamic})/P_0+1]^{2/7}-1\}^{1/2}$. Where $P_0$ is the standard pressure at sea level and $a_0$ is the standard speed of sound at fifteen degrees Celsius. Note that other methods may be used to determine, calculate, or estimate the air speed generated by the deflector 32 from the outputs of one or more pressure sensors.

Block 226: Estimate Actual Aerodynamic Force Applied.

From the air speed determined through the outputs of the pressure-sensing array 42 (block 224) and the vehicle speed from the input conditions (block 222), the control scheme 200 determines or calculates an estimated aerodynamic force currently being applied by the active aerodynamic element. Alternatively, instead of vehicle velocity, the control scheme 200 may use an ambient air speed sensor mounted, for example, on the top of the passenger compartment or at the front end of the body 12.

The differential between velocity of the airflow under the front of the body 12 (i.e., the underbody air speed) and above the front of the body 12 (i.e., the overbody air speed) results in aerodynamic downforce. This effect is similar to, but in the opposing direction from, aerodynamic lift generated by airplane wings, such that the downforce from the deflector 32 may be referred to as negative lift.

Therefore, the control scheme estimates the air speed behind the deflector 32 from the pressure-sensing array 42 and compares it to the airflow velocity above the front of the body 12. There may be a calibrated relationship between vehicle velocity and the air speed moving above the front of the body 12. The exact relationship between the airflow velocity above the front of the body 12 and the vehicle velocity may be determined through testing or characterization, such as in a wind tunnel or through computational fluid dynamic simulation.

In an alternative configuration, the control scheme 200 may utilize the static tube 44 and the upper static tube 47 to determine a differential between the static pressure below the body 12 and the static pressure above the body 12. The relationship between the two static pressures and aerodynamic downforce delivered to the body 12 may be characterized in a wind tunnel or by computational fluid dynamics. A differential pressure sensor may be used to output the pressure differential between the static tube 44 and the upper static tube 47.

The control scheme 200 may access the characterized downforce relationship through a relationship model or a look-up table included in the aero controller 50 or the control system 20. Therefore the static pressure below the body 12 and the static pressure above the body 12 may be used to estimate an applied aerodynamic force from the deflector 32 at its current position.

Furthermore, pressure differentials between locations other than the top and bottom of the body 12 may be used to determine aerodynamic downforce applied to the vehicle 10. Based on the geometry, and aerodynamic properties, of the body 12, there may be other locations to determine the differential pressure that would be indicative of the amount of downforce being generated.

Comparison 228: Target vs. Estimated Aerodynamic Force.

The control scheme 200 compares the estimated aerodynamic force (from block 226) to the target aerodynamic force (from block 214) and determines a force error or force differential therefrom. The comparison of the estimated aerodynamic force and the target aerodynamic force represents whether the target position of the deflector 32 is producing the expected downforce on the vehicle 10. Therefore, the control scheme 200 has a closed loop 230 that verifies the downforce at the active aerodynamic element.

The control scheme 200 determines a modified position for the active aerodynamic element from the force error and from the target aerodynamic force. If the estimated aerodynamic force derived from the pressure-sensing array 42 is substantially equivalent to the target aerodynamic force, the comparison 228 will result in little or no force error, and the modified position will be the same as the target position for the deflector 42.

However, if the estimated aerodynamic force from the closed loop 230 is different from the target aerodynamic force, the control scheme 200 will control the deflector actuator 36 to place the deflector 32 into the modified position. Note that the modification from the closed loop 230 may be occurring on an iterative loop, such that the force error is only used to modify the same target aerodynamic force. The closed loop 230 modification may be dormant until it is able to determine whether the currently requested target aerodynamic force is being satisfied, as opposed to a previously requested force.

The detailed description and the drawings or figures are supportive and descriptive of the subject matter discussed herein. While some of the best modes and other embodiments have been described in detail, various alternative designs, configurations, and embodiments exist.

The invention claimed is:

1. A method of controlling an active aerodynamic element for a vehicle, the method comprising:
    actuating the active aerodynamic element to a target position, wherein the target position is configured to provide a target aerodynamic force and the target aerodynamic force is provided based on dynamic conditions of the vehicle;
    sensing an aerodynamic response characteristic of the active aerodynamic element while actuated to the target position;
    determining an estimated applied aerodynamic force from the aerodynamic response characteristic;
    comparing the estimated applied aerodynamic force to the target aerodynamic force;
    determining a force error from the comparison of the estimated applied aerodynamic force and the target aerodynamic force;
    determining a modified position for the active aerodynamic element from the force error and the target aerodynamic force; and
    actuating the active aerodynamic element to the modified position.

2. The method of claim 1,
    wherein sensing the aerodynamic response characteristic includes sensing an applied force at the active aerodynamic element while actuated to the target position, such that the estimated applied aerodynamic force is a measured aerodynamic force; and
    the force error is determined from comparing the measured aerodynamic force and the target aerodynamic force.

3. The method of claim 2, wherein the active aerodynamic element is a wing and the target position and the modified position are angles of rotation of the wing.

4. The method of claim 3, wherein sensing the applied force at the wing includes measuring force with a force sensor disposed between the wing and the vehicle.

5. The method of claim 1, wherein sensing the aerodynamic response characteristic includes determining a dynamic pressure adjacent the active aerodynamic element, and further comprising:
    calculating an underbody air speed from the dynamic pressure;
    determining an overbody air speed of the vehicle; and
    calculating the estimated applied aerodynamic force from a differential between underbody air speed and the overbody air speed.

6. The method of claim 5, further comprising:
    sensing a static pressure adjacent the active aerodynamic element;
    sensing a stagnation pressure adjacent the active aerodynamic element; and
    determining the dynamic pressure from a differential between the stagnation pressure and the static pressure.

7. The method of claim 6, wherein the overbody air speed is determined from a velocity of the vehicle.

8. The method of claim 7, wherein the underbody air speed is calculated as the square root of twice the dynamic pressure divided by a density of ambient airflow.

9. A vehicle, comprising:
an active aerodynamic element disposed on an underside of the vehicle and movable between a plurality of positions relative to the vehicle;
an actuator configured to position the active aerodynamic element at the plurality of positions;
a pressure sensing array adjacent the active aerodynamic element, and configured to determine a dynamic pressure;
an aero controller in communication with the pressure sensing array and the actuator, and configured to instruct the actuator by:
receiving a target aerodynamic force provided to the aero controller based on dynamic conditions of the vehicle;
determining a target position for the active aerodynamic element from the target aerodynamic force;
controlling the actuator to place the active aerodynamic element into the target position;
determining a dynamic pressure from the pressure sensor array;
calculating an underbody air speed from the dynamic pressure;
determining an overbody air speed of the vehicle;
calculating an estimated applied aerodynamic force from the differential between underbody air speed and the overbody air speed;
comparing the estimated applied aerodynamic force to the target aerodynamic force;
determining a force error from the comparison of the estimated applied aerodynamic force and the target aerodynamic force;
determining a modified position for the active aerodynamic element from the force error and the target aerodynamic force; and
controlling the actuator to place the active aerodynamic element into the modified position.

10. The vehicle of claim 9,
wherein the pressure sensing array includes:
a static pressure sensor disposed adjacent the active aerodynamic element, such that the static pressure sensor is configured to determine a static pressure of airflow caused by the active aerodynamic element; and
a stagnation pressure sensor disposed adjacent the active aerodynamic element, such that the stagnation pressure sensor is configured to determine a stagnation pressure of airflow caused by the active aerodynamic element; and
wherein the aero controller is configured to determine the dynamic pressure from a differential between the stagnation pressure and the static pressure.

11. The vehicle of claim 10, wherein the aero controller is further configured to calculate the underbody air speed as the square root of: two times the dynamic pressure divided by a density of ambient airflow.

12. A vehicle, comprising:
an active aerodynamic element movable between a plurality of positions relative to the vehicle;
a force sensor operatively disposed between the active aerodynamic element and the vehicle, and configured to read an applied force between the active aerodynamic element and the vehicle;
an actuator configured to position the active aerodynamic at the plurality of positions;
an aero controller in communication with the force sensor and the actuator, and configured to instruct the actuator by:
receiving a target aerodynamic force provided to the aero controller based on dynamic conditions of the vehicle;
determining a target position for the active aerodynamic element from target aerodynamic force;
controlling the actuator to place the active aerodynamic element into the target position;
determining the applied force between the active aerodynamic element and the vehicle with the force sensor while the active aerodynamic element is set to the target position;
determining a measured aerodynamic force from the applied force;
comparing the measured aerodynamic force to the target aerodynamic force;
determining a force error from the comparison of the measured aerodynamic force and the target aerodynamic force;
determining a modified position for the active aerodynamic element from the force error and the target aerodynamic force; and
controlling the actuator to place the active aerodynamic element into the modified position.

* * * * *